United States Patent
Suzuki

(10) Patent No.: US 8,259,372 B2
(45) Date of Patent: Sep. 4, 2012

(54) METHOD, SYSTEM, PROGRAM AND MEDIUM FOR DISPLAYING READ IMAGE

(75) Inventor: Nobukazu Suzuki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 873 days.

(21) Appl. No.: 10/765,885

(22) Filed: Jan. 29, 2004

(65) Prior Publication Data

US 2004/0184115 A1    Sep. 23, 2004

(30) Foreign Application Priority Data

Jan. 31, 2003  (JP) ................................ 2003-024418

(51) Int. Cl.
  *G03F 3/10* (2006.01)
(52) U.S. Cl. ........ 358/527; 358/1.9; 358/1.18; 358/537; 358/538; 358/540
(58) Field of Classification Search ................ 358/296, 358/474, 452, 505, 488, 527, 531, 537, 538, 358/453
See application file for complete search history.

(56) References Cited

U.S. PATENT DOCUMENTS

| | | | | |
|---|---|---|---|---|
| 4,825,250 A * | 4/1989 | Miyata et al. | ............ | 399/82 |
| 4,897,737 A * | 1/1990 | Shalev | ............ | 358/489 |
| 4,935,809 A * | 6/1990 | Hayashi et al. | ............ | 358/527 |
| 5,047,843 A * | 9/1991 | Miyakawa | ............ | 358/505 |
| 5,198,853 A * | 3/1993 | Ichihara et al. | ............ | 399/16 |
| 5,313,311 A * | 5/1994 | Brandkamp | ............ | 358/474 |
| 5,414,811 A * | 5/1995 | Parulski et al. | ............ | 345/501 |
| 5,486,893 A * | 1/1996 | Takagi | ............ | 396/147 |
| 6,178,005 B1 * | 1/2001 | Yoshida | ............ | 358/1.18 |
| 6,313,923 B1 * | 11/2001 | Takanashi et al. | ............ | 358/1.18 |
| 6,330,051 B1 * | 12/2001 | Takanashi | ............ | 355/40 |
| 6,333,752 B1 * | 12/2001 | Hasegawa et al. | ............ | 715/764 |
| 6,333,758 B1 * | 12/2001 | Suzuki et al. | ............ | 348/96 |
| 6,563,535 B1 * | 5/2003 | Anderson | ............ | 348/231.2 |
| 6,784,904 B2 * | 8/2004 | Dow et al. | ............ | 715/810 |
| 6,819,785 B1 * | 11/2004 | Vining et al. | ............ | 382/128 |
| 6,826,313 B2 * | 11/2004 | Robar et al. | ............ | 382/287 |
| 6,842,265 B1 * | 1/2005 | Votipka et al. | ............ | 358/1.16 |
| 6,862,102 B1 * | 3/2005 | Meisner et al. | ............ | 358/1.15 |
| 7,065,716 B1 * | 6/2006 | Rzepkowski et al. | ............ | 715/839 |
| 7,145,699 B2 * | 12/2006 | Dolan | ............ | 358/452 |
| 2001/0009428 A1 * | 7/2001 | Dow et al. | ............ | 345/854 |
| 2004/0085595 A1 * | 5/2004 | Sakaguchi | ............ | 358/487 |

FOREIGN PATENT DOCUMENTS

| | | |
|---|---|---|
| JP | 2000-163239 | 6/2000 |
| JP | 2002-010059 | 1/2002 |

OTHER PUBLICATIONS

Japanese Office Action dated May 22, 2007, issued in corresponding Japanese patent application No. 2003-024418, with English translation.

* cited by examiner

*Primary Examiner* — Richard Zhu

(74) *Attorney, Agent, or Firm* — Fitzpatrick, Cella, Harper & Scinto

(57) ABSTRACT

Image information of an original(s) is displayed, for example, after rotated to assume an easily viewable orientation for a user. The placement state of an original(s) on an original support of an image reading apparatus is detected and the image information may be displayed after rotated by 90 degrees based on the detection result. In addition, display orientation may be set, so that a thumbnail(s) is displayed in the set orientation.

7 Claims, 7 Drawing Sheets

METHOD, SYSTEM, PROGRAM AND MEDIUM FOR DISPLAYING READ IMAGE

BACKGROUND OF THE INVENTION

1. Field of the Invention

The present invention relates to a technology for improving visibility of an image when image information of a read film original is displayed.

2. Related Background Art

In flat bead type image reading apparatuses that have been developed in recent years, when a strip of 35 mm film is to be read, the strip is set along the sub scanning direction of the image reading apparatus due to limitations of space. In other words, a strip of 35 mm film is read under the state in which its long side is oriented in the sub scanning direction. However, the general trend is that when the read image is displayed on a display device of a computer, preview display for a transparent original is performed in the form of thumbnail type display that is similar to the index print for the APS film, in order to improve ease of operation by users. Therefore, when thumbnails of a 35 mm film strip are displayed, the image that has been read along the longitudinal direction is rotated by 90 degrees, since horizontal display is better in terms of visibility.

However, a 35 mm film slide with a mount, a Brownie film, or 4×5 inch film can be set in the above-described image reading apparatus without paying attention to the orientation of the film. On the other hand, in the conventional image reading apparatus, thumbnails are displayed in the state in which read image is rotated by 90 degrees in order to improve ease of user's operation of thumbnails for a 35 mm film strip. Consequently, when a 35 mm film with a mount, a Brownie film or a 4×5 inch film is set in the image reading apparatus in a landscape (or horizontal) orientation, it is also rotated by 90 degrees and displayed in a portrait (or vertical) orientation. This deteriorates visibility and user operability.

In the conventional image reading apparatus, a film guide is generally used in order to set films in the apparatus correctly. However, when films are set in the image forming apparatus without the film guide, there might be a mixed situation in which some films are placed in a portrait orientation and some films are placed in a landscape orientation. In that case, images placed in a portrait orientation and images placed in a landscape orientation are mixed in the thumbnail display. This situation is undesirable from the view point of appearance or operability.

SUMMARY OF THE INVENTION

An object of the present invention is to make it possible to rotate and display image information of originals in an easily viewable orientation for users irrespective of the orientation of the originals set on an original support.

To achieve the above object, the apparatus for reading images according to the present invention is constituted as follows.

[1] A method of reading an original placed on an original support and displaying it, comprising an image reading step of reading an image of the original placed on the original support to generate an image signal, a placement orientation detection step of detecting placement orientation of said original based on the image signal generated in said image reading step, an image signal rotation step of rotating, when the placement orientation of said original detected in said placement orientation detection step is different from a predetermined orientation, said image signal to said predetermined orientation, and a read image signal display step of displaying the read image signal in an orientation aligned with a predetermined orientation.

[2] A method of displaying image information, wherein when image information of an original that is different in its horizontal length and vertical length placed on an original support is read by an image reading apparatus and said read images are displayed on a display apparatus in a thumbnail display form, placement orientation of said original placed on said original support is detected and said image information is displayed in a state in which a horizontal or vertical direction of the image information of said original is aligned in a predetermined orientation irrespective of the detected placement orientation of said original.

[3] A system for displaying image information, wherein when image information of an original that is different in its horizontal length and vertical length placed on an original support is read by an image reading apparatus and said read image is displayed on a display apparatus in a thumbnail display form, placement orientation of said original placed on said original support is detected and said image information is displayed in a state in which a horizontal or vertical direction of the image information of said original is aligned in a predetermined orientation irrespective of the detected placement orientation of said original.

[4] A program for carrying out a method of displaying image information as set forth in the above paragraph [3] under a control by a computer.

[5] A computer-readable recording medium in which a program set forth in the above paragraph [4] is stored.

DESCRIPTION OF THE PREFERRED EMBODIMENTS

In the following, a preferred embodiment of the present invention will be specifically described with reference to the accompanying drawings.

Figure 1:
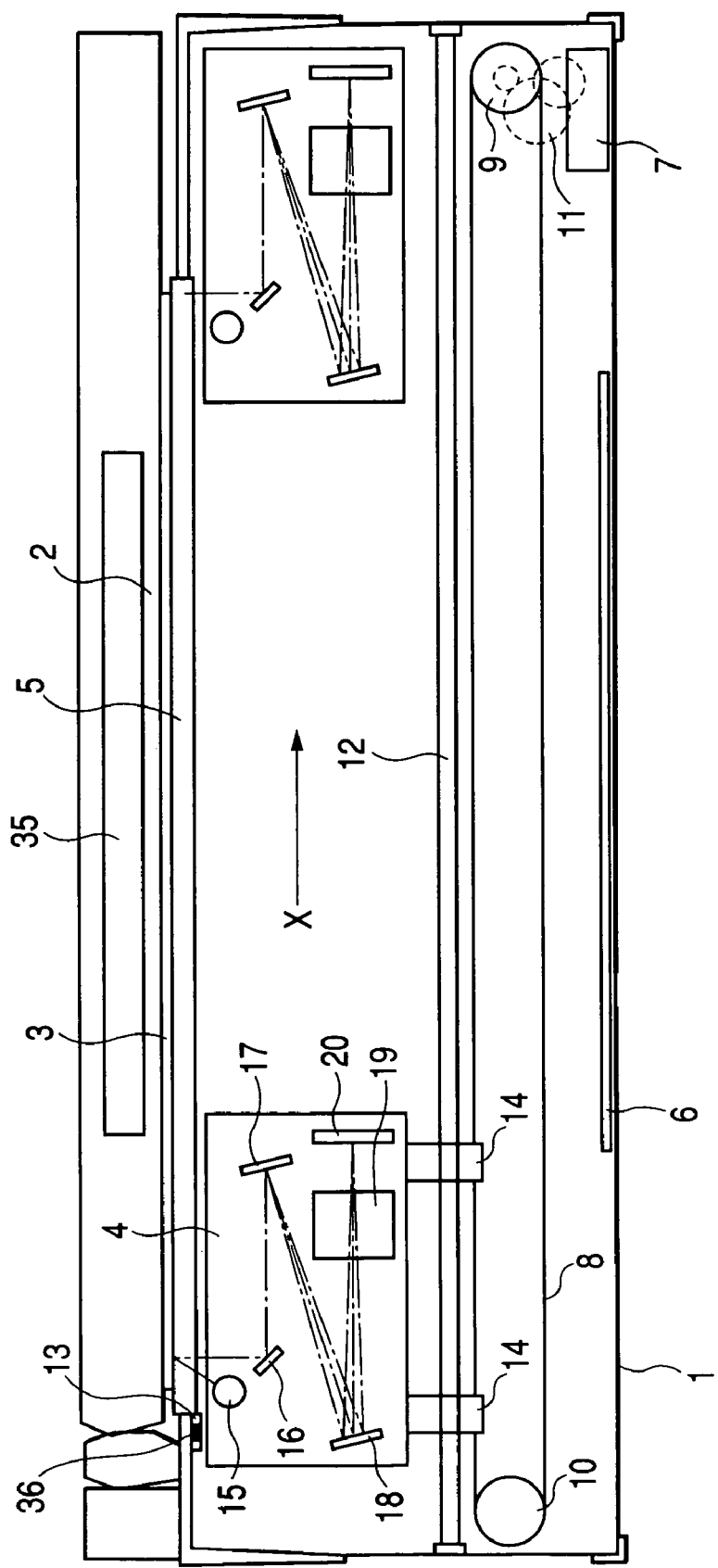
FIG. 1 is a cross sectional view schematically showing the hardware structure of an image reading apparatus according to an embodiment of the present invention.

FIG. 1 is a cross sectional view schematically showing the hardware structure of an image reading apparatus as an embodiment of the present invention. In FIG. 1, reference numeral 1 designates a body of a scanner, reference numeral 2 designates a unit for transparent original and reference numeral 3 designates an original to be read. The scanner 1 is connected with a host computer (which will be simply referred to as a host hereinafter) via an interface cable. The scanner 1 is provided with a movable optical unit 4, an original support glass 5, an electric circuit board 6, a pulse motor 7, an endless belt 8, pulleys 9 and 10, a gear train 11, a guide rail 12 and a white reference plate 13. The white reference plate 13 has a black mark 36 formed thereon. The scanner 1 determines a reading area utilizing that black mark 36 as a reference to read an image. Connections to the optical unit 4 and the pulse motor 7 are respectively made by cables that are not shown in the drawings. The optical unit 4 is mounted on the guide rail 12 with mounting means in such a way that the optical unit 4 can slide on the guide rail 12. The mounting means 14 is secured to the endless belt 8. The movable optical unit 4 is composed of a light source for reflective original 15, a plurality of reflecting mirrors 16, 17 and 18, an imaging lens 19 and a line sensor 20 serving as image pickup means.

Firstly, a reflective original reading operation of the scanner 1 will be briefly described. The reading operation of the scanner 1 is stared in response to a read command from the host. The scanner 1 turns on the light source for reflective original 15 and light reflected from an original is reflected by the plurality of mirrors 16, 17 and 18 and focused on the sensor 20 via the imaging lens 19, so that one line image along the main scanning direction is read. The endless belt 8 is driven by the pulley 9 that is rotated by the driving force of the pulse motor 7 transmitted via the gear train 11. Thus, the optical unit 4, which is fixed to the endless belt 8 by the mounting means 14, is moved on the guide rail 12 in the sub scanning direction indicated by arrow X.

The scanner 1 repeats the aforementioned reading of line image along the main scanning direction while moving the optical unit 4 in the sub scanning direction. The scanner 1 moves the optical unit 4 shown in FIG. 1 up to the position shown by the broken line while performing the reading operation, so that the whole area of the original support glass 5 can be scanned. However, a partial area image of the original support glass can be read in accordance with the content of a command from the host. When only a partial area image is to be read, with respect to the main scanning direction, the sensor output is restricted to a pixel area to be used by control means provided on the electric circuit board that will be described later, and with respect to the sub scanning direction, the moving area of the optical unit 4 is restricted by the control means.

Next, a transparent original reading operation of the scanner 1 will be briefly described. The scanner 1 turns off the light source for reflective original 15 and turns on a light source for transparent original 35. The scanner 1 moves the optical unit 4 to a position suitable for reading transparent originals. Thus, transmitted light from the light source for transparent original 35 is reflected by the plurality of mirrors 16, 17 and 18 and focused on the sensor 20 via the imaging lens 19, so that one line image along the main scanning direction is read. The endless belt 8 is driven by the pulley 9 that is rotated by the driving force of the pulse motor 7 transmitted via the gear train 11. Thus, the optical unit 4, which is fixed to the endless belt 8 by the mounting means 14, is moved on the guide rail 12 in the sub scanning direction indicated by arrow X.

The scanner 1 repeats the aforementioned reading of line image along the main scanning direction while moving the optical unit 4 in the sub scanning direction. The scanner 1 moves the optical unit 4 shown in FIG. 1 up to the position shown by the broken line while performing the reading operation, so that the whole area of the original support glass 5 can be scanned. However, a partial area image of the original support glass can be read in accordance with the content of a command from the host. When only a partial area image is to be read, with respect to the main scanning direction, the sensor output is restricted to a pixel area to be used by control means provided on the electric circuit board that will be described later, and with respect to the sub scanning direction, the moving area of the optical unit 4 is restricted by the control means.

There are plural predetermined speeds for moving the optical unit 4 in the sub scanning direction, and a system controller 26 selects an appropriate speed to perform image reading based on the image reading setting designated by the host.

Figure 2:
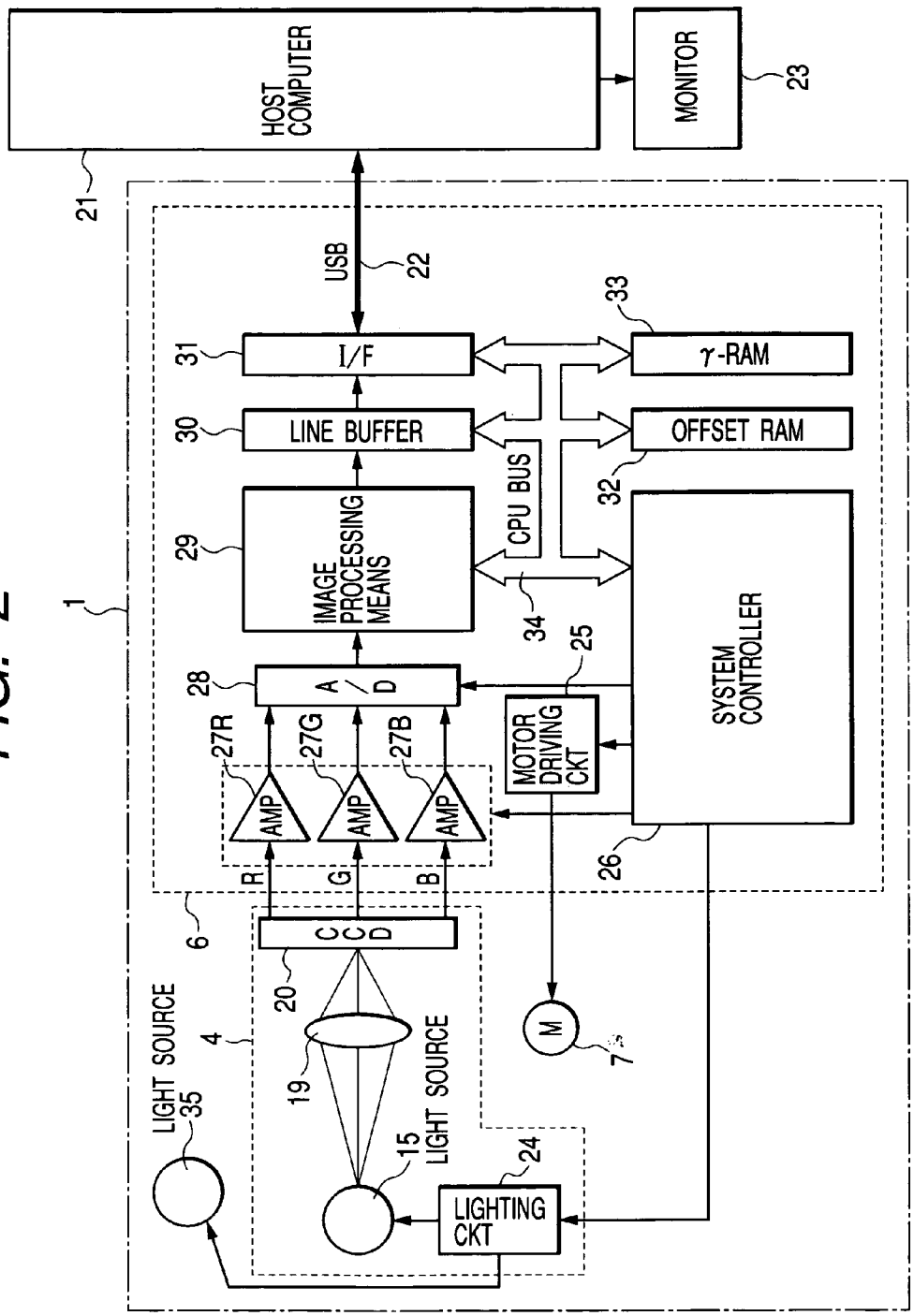
FIG. 2 is a block diagram showing the functional arrangement of the image reading apparatus according to the embodiment of the present invention.

In the following, functional blocks of the scanner will be described with reference to FIG. 2.

Referring first to the optical unit 4, reference numeral 24 designates a light source lighting circuit for turning the light source for reflective original 15 and light source for transparent original 35 on. The light source lighting circuit 24 includes detection means for detecting light quantity of the light sources. In addition, the light source lighting circuit 24 switches the light source for reflective original 15 and light source for transparent original 35. In the case that cold cathode tubes are used as the light source for reflective original 15 and light source for transparent original 35, the lighting circuit 24 is constructed as a so-called inverter circuit.

In the electric circuit board 6, reference numeral 25 designates a motor driving circuit for driving the pulse motor 7. The motor driving circuit 25 outputs an excitation switching signal for the pulse motor 7 based on a signal from the system controller 26 serving as system control means of the scanner 1. Reference numerals 27R, 27G and 27B designate analogue gain adjusters that are capable of amplifying analogue signals output from the line sensor 20 with a variable gain.

Reference numeral 28 designates an A/D converter for converting the analogue image signal output from the variable analogue gain adjuster 27 into a digital image signal. Reference numeral 29 designates image processing means for effecting an image process on the digitized image signal, such as offset correction, shading correction, digital gain adjustment, color balance correction, masking, resolution conversion in the main and sub scanning directions, or image compression. Reference numeral 30 designates a line buffer for storing image data temporarily. The line buffer 30 is composed of a general purpose random access memory.

Reference numeral 31 designates an interface portion for allowing communication with the host 21. Although a USB interface is adopted in the interface portion 31 of this apparatus, different interfaces such as an IEEE1394 interface may also be used. Reference numeral 32 designates an offset RAM to be used as a working area of the image processing process. The offset RAM 32 is used for compensating RGB interline offsets for the line sensor 20 in which line sensors for R, G and B are arranged in parallel with each other with predetermined offsets. In addition, the RAM 32 temporarily stores various data for shading correction, etc. In this apparatus the RAM 32 is composed of a general purpose random access memory.

Reference numeral 33 designates a gamma RAM that stores gamma curves for effecting gamma correction. Reference numeral 26 designates a system controller in which all the sequences of the scanner are stored. The system controller 26 effects various controls based on commands from the host 21. Reference numeral 34 designates system buses for connecting the system controller 26, the image processing means 29, the line buffer 30, the interface portion 31, the offset RAM 32 and the gamma RAM 33. The system bus 34 is composed of an address bus and a data bus.

In the following, an example of a state in which films are set in the image reading apparatus will be described with reference to FIG. 3.

Figure 3:
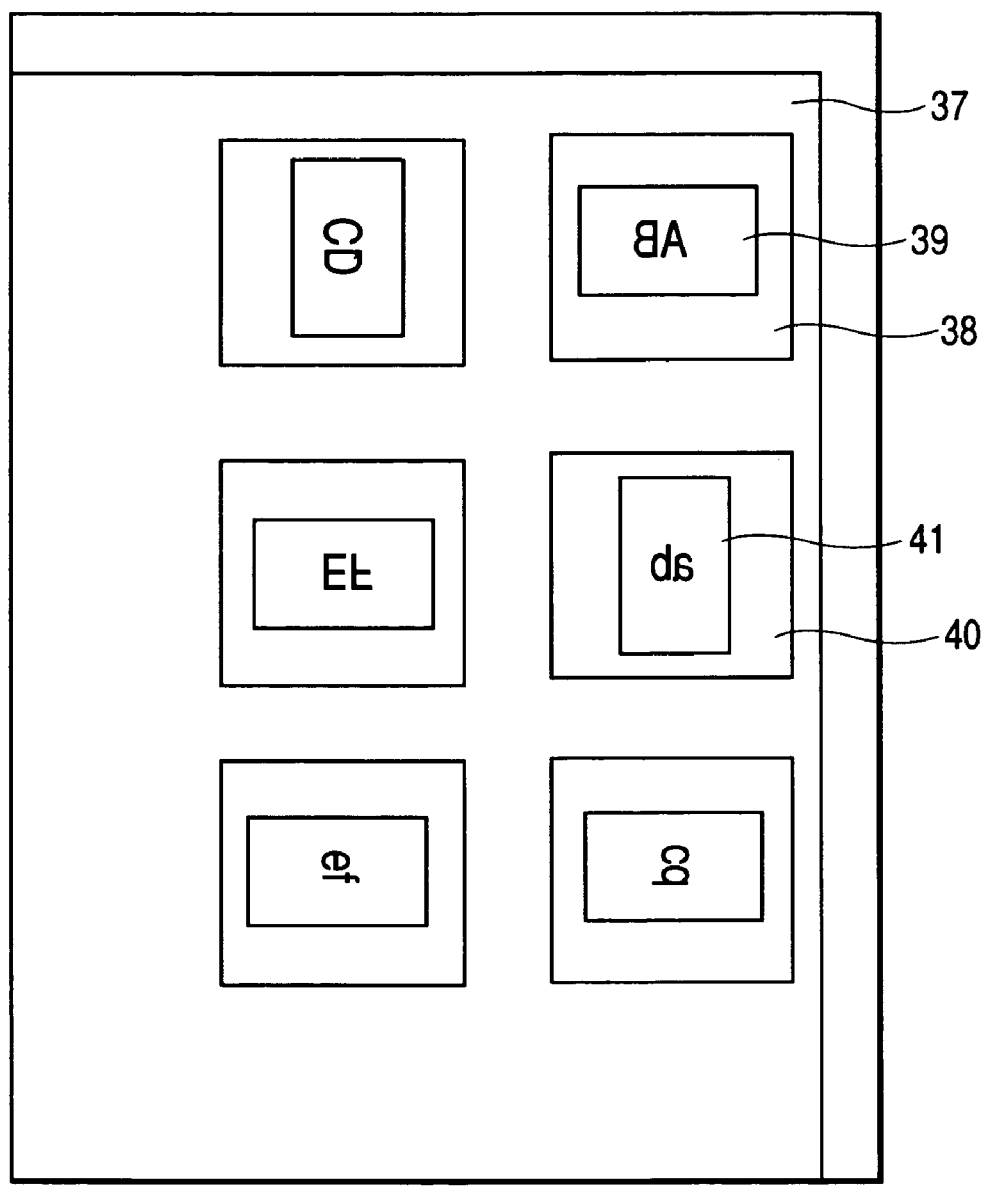
FIG. 3 illustrates an example of placement of films on an original support of the image reading apparatus.

In FIG. 3, reference numeral 37 designates an original support of the image reading apparatus on which films are placed while they are read in the horizontal main scanning direction and in the vertical sub scanning direction. Reference numerals 38 and 40 designate mounts for a 35 mm film, while reference numerals 38 and 39 designate 35 mm films. Reference numerals 38 and 39 designate an example a 35 mm film that is set in a landscape orientation (i.e. horizontal orientation) in the image reading apparatus, while reference numerals 40 and 41 designate an example of a film that is set in a portrait orientation (i.e. vertical orientation) in the image reading apparatus. Since the films are read from the original support side, the films should be placed in such a way that they are like mirror images as seen from above. Films are sometimes placed on the original support of the image reading apparatus in such a mixed manner in which some films are oriented in the landscape manner and other films are oriented in the portrait manner. In addition, what will be placed on the original support is not only 35 mm films but also Brownie films and 4×5 inch films, etc.

Figure 4:
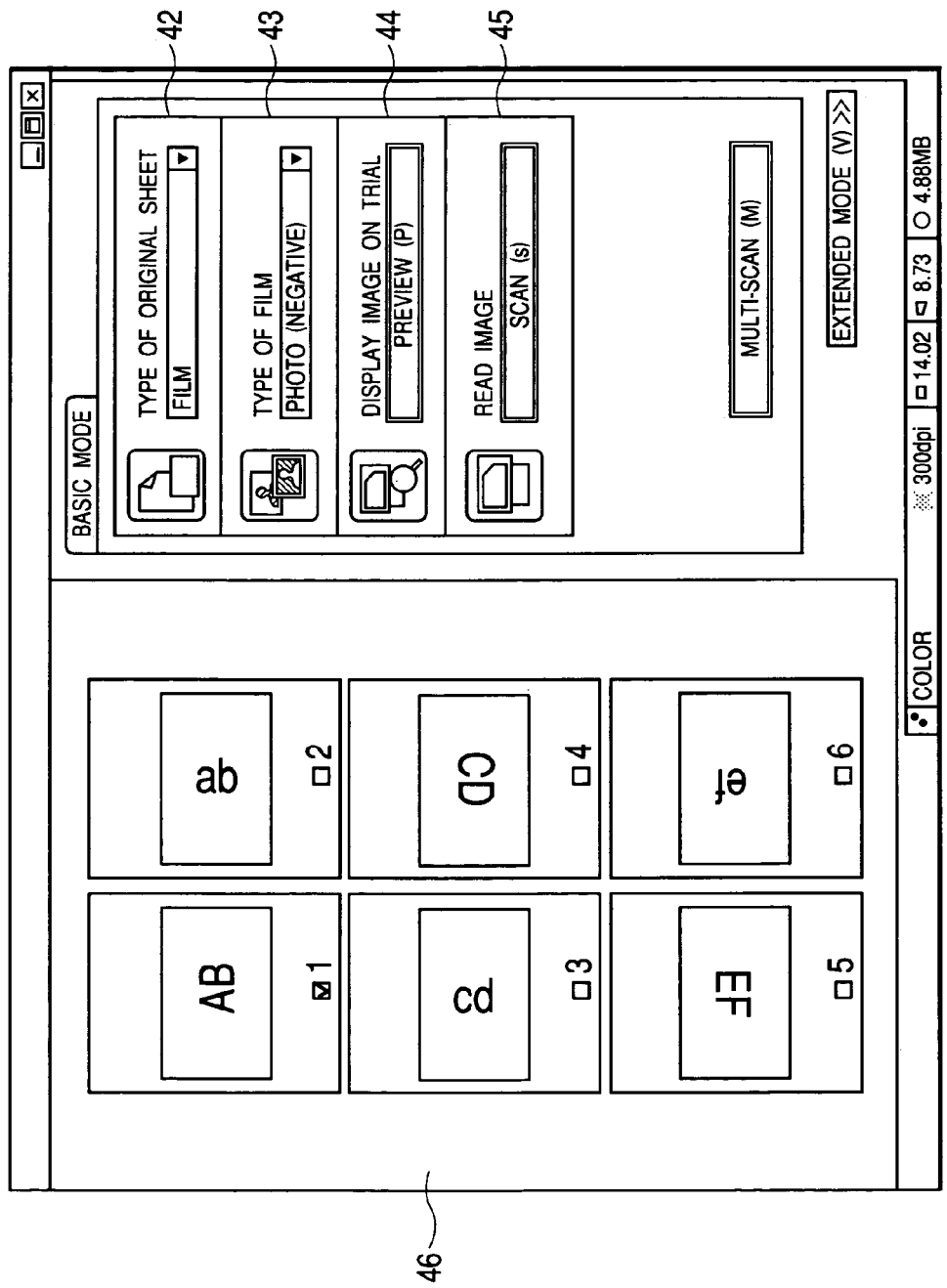
FIG. 4 illustrates an example of a screen of an operating portion of a driver software for controlling the image reading apparatus through a host computer.

Next, an example of an operating portion of a driver software for controlling the image reading apparatus on the host 21 will be described in the following with reference to FIG. 4.

Reference numeral 42 designates a menu for selecting the scheme of image reading of the image reading apparatus. A user can select, as the image reading scheme of the image reading apparatus, either reading of reflective original or reading of transparent film original. Reference numeral 43 designates a menu for selecting the type of the original. With this menu, the user selects either negative film or positive film as the object whose image is to be read into the host 21. Reference numeral 44 designates a button for displaying the images to be read into the host 21 in the area 46. This relates to a process in which provisional images (or preview images) are read for applying image processing before an image(s) is read into the host 21. Reference numeral 45 designates a button for reading an image(s) into the host 21. With operation of this button, reading of an image(s) into the host is started. Reference numeral 46 designates thumbnail display of the films. In this thumbnail display, the films set on the original support of the image reading apparatus in a mixed manner with the landscape orientation and the portrait orientation are displayed uniformly in the landscape orientation.

Figure 5:
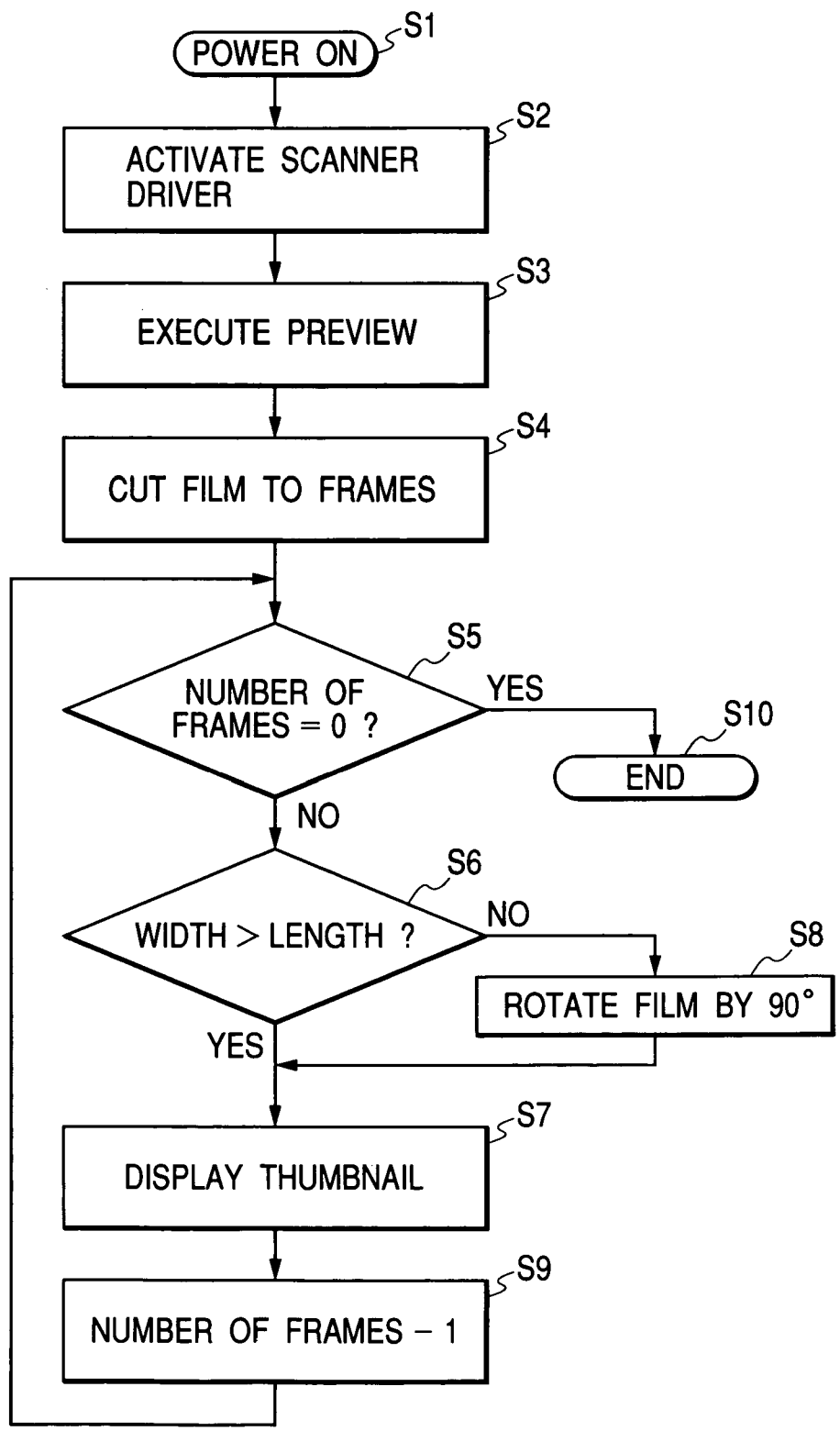
FIG. 5 is a flow chart of a control process of an image reading operation of the image reading apparatus according to the embodiment of the present invention.

In the following, a control process of image reading operation according to this embodiment will be described with reference to FIG. 5.

The power of the scanner 1 is turned on (step 1). At that time, initialization of the scanner including determination of an image reading reference position of the scanner 1 and other processes is performed, so that the scanner is brought into a state capable of performing image reading. A driver software for the scanner 1 is activated in the host 21 that controls the scanner 1 (step 2). Upon depression of the preview button 43, the scanner 1 reads an image of the whole area of the original support 37 (step 3).

Then, frames of the films are cut out (or profiled) from the image read in step 3. During this process, how many frames of films are present on the original support 37 is detected, and the coordinate position of each frame and the length of the horizontal and vertical sides of each film frame are also detected (step 4). When it is determined that the number of the frames of the films is not zero (step 5), the process proceeds to step 6, in which the length of the horizontal side and the length of the vertical side of each frame detected in step 4 are compared (step 6). When it is determined that the horizontal size is larger than the vertical size, the process proceeds to step 7, in which a thumbnail of the film is displayed as it is (step 7). When it is determined that the horizontal size is smaller than the vertical size, the process proceeds to step 8, in which a thumbnail of the film is displayed in the state the film image is rotated by 90 degrees (approximately 90 degrees speaking strictly, since the inclination of the film is also corrected to erect the image in the case that the film is placed with a little inclination) (step 8). The process of step 5 and after is repeated the number of times corresponding to the number of the frames of the films (step 9).

With the above-described process, it is possible to provide an image reading apparatus that can display a thumbnail(s) without depending on the orientation of a film(s) set in the image reading apparatus by a user, without an increase in the cost and without modifying the structure of the conventional image reading apparatus.

Figure 6:
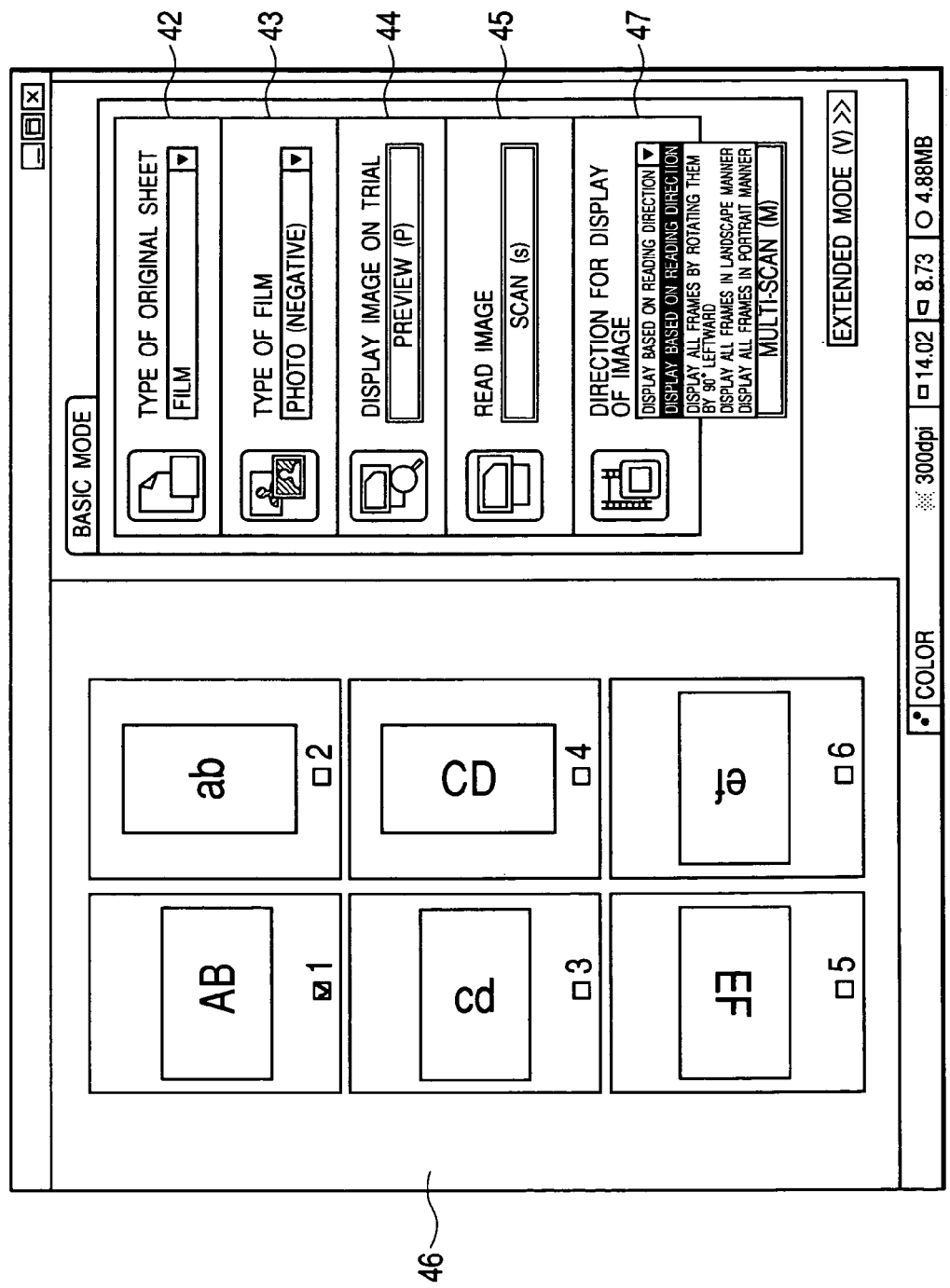
FIG. 6 illustrates an example of a screen of an operating portion of a driver software for controlling the image reading apparatus through a host computer according to a modification of the embodiment of the present invention.

Next, an modification of the above-described embodiment will be described with reference to FIG. 6.

Figure 7:
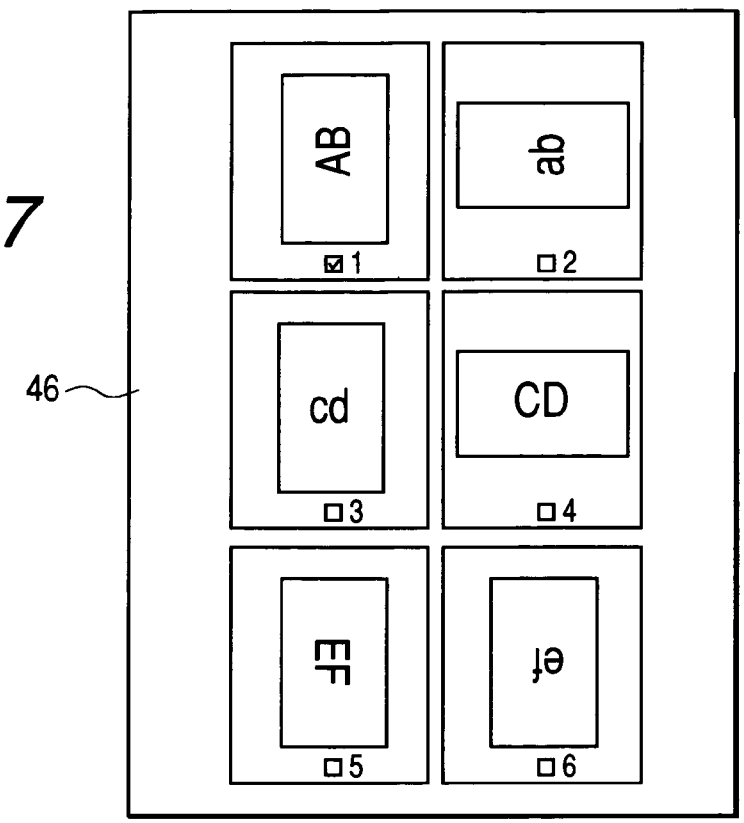
FIG. 7 illustrates an example of image display by the driver software for controlling the image reading apparatus through a host computer according to the modification of the embodiment of the present invention.

Some users prefer that when mounted films are placed on the original support as shown in FIG. 3, the films are read and displayed as they are. In addition, all the frames may be displayed in a portrait orientation. The modification accommodates these display options. In this modification, a selection menu 47 for image display direction is added to the selection menus for reading scheme shown in FIG. 4. In this selection menu, the modes "display based on reading direction", "display all frames by rotating them by 90° leftward", "display all frames in landscape manner" and "display all frames in portrait manner" can be selected in relation to the reading direction. In the case that the mode "display all frames in landscape manner" is selected, the thumbnails are displayed in the manner shown in FIG. 4. In the case shown in FIG. 6, the mode "display based on reading direction" is selected by the popup menu, so that the thumbnails in the display area 46 are displayed in the orientation as they are read. FIG. 7 illustrates a display under the mode "display all frames by rotating them by 90° leftward". The apparatus may also be designed in such a way that each frame can be selected to be rotated or inverted horizontally or vertically so as to be displayed.

Figure 8:
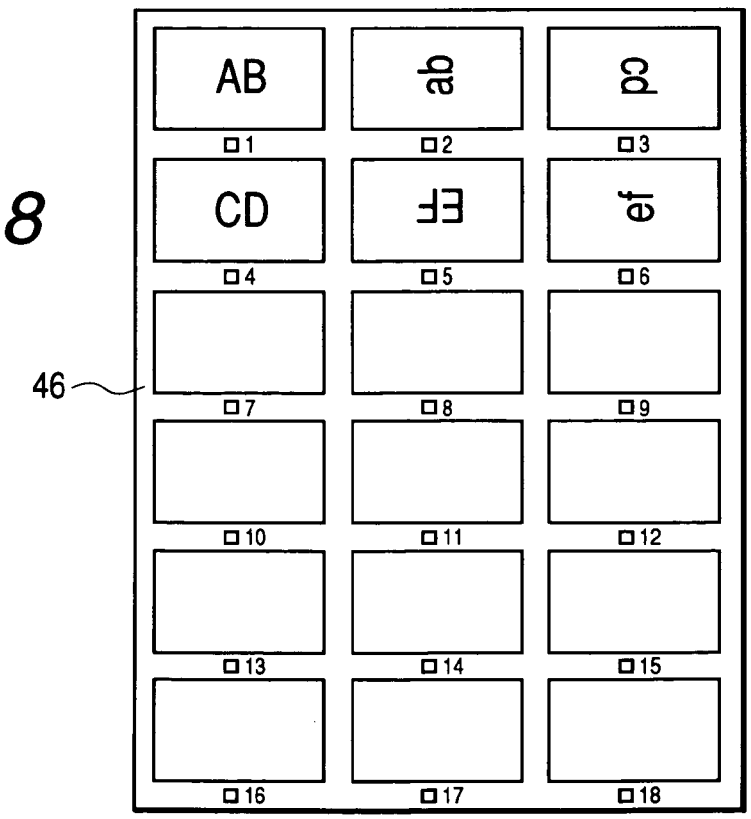
FIG. 8 illustrates another example of image display by the driver software for controlling the image reading apparatus through a host computer according to the modification of the embodiment of the present invention.

In the case that all the frames are displayed in the landscape manner, the margins can be made small as shown in FIG. 8, so that an increased number of images can be displayed in one screen.

As has been described above, according to the embodiment, cutting-out of effective image areas is performed after films are set in the image reading apparatus and an image of the whole area of the image reading apparatus is read, and the size of the effective areas thus cut out is detected. Based on the size detection, the horizontal size and the vertical size of each effective image area are compared, and it is determined based on the result of this comparison whether the image is to be displayed after rotated by 90° or displayed as it is in the thumbnail display. With the above features, it is possible to provide an image reading apparatus that can display a thumbnail(s) without depending on the orientation of a film(s) set in the image reading apparatus by a user, without an increase in the cost and without modifying the structure of the conventional image reading apparatus. In addition, a driver software having an excellent availability or operability can be provided for users.

It is apparent that the object of the present invention can also be attained by feeding a system or an apparatus with a storing medium in which a program code of a software that realizes the above-described functions of the embodiment is stored to cause that system or computer (or CPU or MPU) to read the program code stored in the storing medium to execute it.

In this case, the program code read out from the storing medium itself realizes the above-described functions of the embodiment, and therefore the program code per se or the storing medium that stores the program code constitutes the subject of the present invention.

The storing medium for providing the program code may include a flexible disk, a hard disk, an optical disk, and magneto optical disk, a CD-ROM, a CD-R, a magnetic tape, a nonvolatile memory card, or a ROM, etc.

It should be understood that the present invention covers not only the case in which the above-described functions of the embodiment is realized by execution of a program code read by a computer but also the case in which a part or all of the process is executed by an OS (i.e. a basic system or an operating system) running on the computer based on a command(s) by the program code so that the above-described functions of the embodiment are realized by that process.

In addition, it should also be understood that the present invention covers the case in which a program code read out from a storing medium is written in a memory provided in a function extension board inserted in a computer or a function extension unit connected to the computer and a part or all of the actual process is executed by a CPU or the like provided in the function extension board or the function extension unit so that the above-described functions of the embodiment are realized by that process.

What is claimed is:

1. A method of reading a plurality of film originals, each being mounted with a slide mount, which are placed on an original support of an image reading apparatus in a plurality of orientations, and displaying the plurality of film originals on a monitor unit of a computer connected to the image reading apparatus, the method comprising:
   an image reading step of:
      (i) reading each of the plurality of film originals placed on the original support in a mixed manner with a landscape orientation and a portrait orientation,
      (ii) identifying a number of frames of film originals simultaneously present on the original support, and
      (iii) cutting out image areas for each of the frames of film originals to generate a plurality of image signals;
   a placement orientation detection step of detecting a placement orientation for each of the plurality of film originals based on lengths in horizontal and vertical directions of each image signal corresponding to one of the cut out image areas;
   a display orientation setting step of setting a display orientation for all of the plurality of image signals, by one user selected setting, wherein a user selects from among:
      (i) a landscape orientation,
      (ii) an orientation where each of the plurality of image signals is rotated by a predetermined angle regardless of the placement orientation for each of the plurality of film originals detected in said placement orientation detection step, and
      (iii) an orientation corresponding to the placement orientation for each of the plurality of film originals detected in said placement orientation detection step;
   an image signal rotation step of executing in accordance with the display orientation set for the plurality of image signals in said display orientation setting step:
      (i) a first image signal rotation of rotating each of the plurality of image signals to be in the landscape orientation,
      (ii) a second image signal rotation of rotating each of the plurality of image signals by a predetermined angle irrespective of the placement orientation detected in said placement orientation detection step, or
      (iii) no image signal rotation; and
   a read image signal display step of simultaneously displaying the plurality of image signals on one display screen of the monitor unit according to the display orientation set in said display orientation setting step and in a form of a thumbnail type display.

2. A method according to claim 1, wherein in said display orientation step, a user may further select (iv) a predetermined orientation, as the display orientation for the plurality of image signals, and said image signal rotation step may further execute (iv) a third image signal rotation of rotating each of the plurality of image signals to be in the predetermined orientation, in accordance with the display orientation set in said display orientation step.

3. A method according to claim 1, wherein after rotating each of the plurality of read image signals by the predetermined angle during the second image signal rotation in said image signal rotation step, an inclination of each of the plurality of read image signals is corrected with respect to a vertical or horizontal direction.

4. A method according to claim 1, wherein, in said image reading step, a plurality of originals placed on the original support are read and the other steps are performed on an image signal obtained from each of the originals individually.

5. A system for reading a plurality of film originals, each being mounted with a slide mount, which are placed on an original support of an image reading apparatus in a plurality of orientations and for displaying the plurality of film originals on a monitor unit of a computer connected to the image reading apparatus, the system comprising:
   an image reader for:
      (i) reading each of the plurality of film originals placed on the original support in a mixed manner with a landscape orientation and a portrait orientation,
      (ii) identifying a number of frames of film originals simultaneously present on the original support, and
      (iii) cutting out image areas for each of the frames of the film originals to generate a plurality of image signals;
   a placement orientation detector for detecting a placement orientation for each of the plurality of film originals based on lengths in horizontal and vertical directions of each image signal corresponding to one of the cut out image areas;
   a display orientation setting unit for setting a display orientation for all of the plurality of image signals, by one user selected setting, wherein a user selects from among:
      (i) a landscape orientation,
      (ii) an orientation where each of the plurality of image signals is rotated by a predetermined angle regardless of the placement orientation for each of the plurality of film originals detected by said placement orientation detector, and (iii) an orientation corresponding to the placement orientation for each of the plurality of film originals detected by said placement orientation detector;

an image signal rotator for executing in accordance with the display orientation set for the plurality of image signals by said display orientation setting unit:
(i) a first image signal rotation of each of the plurality of image signals to be in the landscape orientation, (ii) a second image signal rotation of rotating each of the plurality of image signals by a predetermined angle irrespective of the placement orientation detected by said placement orientation detector, or
(iii) no image signal rotation; and a read image signal display for simultaneously displaying the plurality of image signals on one display screen of the monitor unit according to the display orientation set by said display orientation setting unit and in a form of a thumbnail type display.

6. A method according to claim 1, wherein the plurality of image signals displayed on the monitor unit are images of the plurality of film originals.

7. A system according to claim 5, wherein the plurality of image signals displayed on the monitor unit are images of the plurality of film originals.

* * * * *